(12) United States Patent
Li et al.

(10) Patent No.: US 9,338,081 B2
(45) Date of Patent: May 10, 2016

(54) METHOD AND COMPUTER PROGRAM PRODUCTS FOR ROUTING A DATA UNIT

(71) Applicant: Alcatel Lucent, Boulogne-Billancourt (FR)

(72) Inventors: Zheng Li, Lokeren (BE); Eric Borghs, Geel (BE); Koen Hooghe, Berchem (BE); Bartlomiej Kozicki, Berchem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/394,896

(22) PCT Filed: May 13, 2013

(86) PCT No.: PCT/EP2013/059777
§ 371 (c)(1),
(2) Date: Oct. 16, 2014

(87) PCT Pub. No.: WO2013/171145
PCT Pub. Date: Nov. 21, 2013

(65) Prior Publication Data
US 2015/0124819 A1   May 7, 2015

(30) Foreign Application Priority Data

May 16, 2012 (EP) .................................. 12290163

(51) Int. Cl.
*H04L 12/733* (2013.01)
*H04L 29/12* (2006.01)
(Continued)

(52) U.S. Cl.
CPC ........ *H04L 45/122* (2013.01); *H04L 29/08306* (2013.01); *H04L 29/12009* (2013.01); *H04L 45/74* (2013.01); *H04L 61/10* (2013.01); *H04L 61/2007* (2013.01)

(58) Field of Classification Search
CPC ... H04L 45/122; H04L 61/2007; H04L 45/74; H04L 29/08306; H04L 29/12009; H04L 61/00; H04L 61/10

USPC .................................. 370/254–255, 464–465
See application file for complete search history.

(56) References Cited

U.S. PATENT DOCUMENTS 4,779,092 A  *  10/1988  Takao .................. H04L 12/433
                                                340/9.12
5,204,669 A  *   4/1993  Dorfe .................... G06F 15/177
                                                340/12.23
(Continued)

FOREIGN PATENT DOCUMENTS

EP         1124351    *  5/2013  ............. H04L 12/70
JP      H08116578 A      5/1996
JP     2007538306 A     12/2007

OTHER PUBLICATIONS

P. Levis etal., "Overview of Existing Routing Protocols for Low Power and Lossy Networks draft-ietf-roll-protocols-07," IETF Trust, pp. 1-26, Apr. 2009.

(Continued)

*Primary Examiner* — Warner Wong
(74) *Attorney, Agent, or Firm* — Harness, Dickey & Pierce, P.L.C.

(57) ABSTRACT

For routing a data unit through a chain of nodes, the nodes are assigned addresses that are increasing in one direction of appearance of the nodes in the chain. For routing the data unit, the receiving node first verifies if the destination address of the data unit corresponds with the address of its first hop neighbor or its second hop neighbor, and the node routes the data unit directly to its first hop neighbor or its second hop neighbor if this is the case. Otherwise, the node determines the difference between the destination address of the data unit and its own address or the difference between the source and destination address of the data unit, selects a routing direction depending on the sign of this difference, and selects a first hop link when the difference is in magnitude below a threshold value or a second hop link when the difference is above the threshold value.

8 Claims, 2 Drawing Sheets

(51) Int. Cl.
*H04L 29/08* (2006.01)
*H04L 12/741* (2013.01)

(56) References Cited

U.S. PATENT DOCUMENTS

| | | | | |
|---|---|---|---|---|
| 7,139,839 | B2 * | 11/2006 | White | H04L 12/403 370/254 |
| 8,010,714 | B2 * | 8/2011 | Simon | G06F 12/0661 710/10 |
| 2006/0291459 | A1 | 12/2006 | Bain | |
| 2007/0234071 | A1 * | 10/2007 | Pyeon | G06F 13/4247 713/190 |
| 2007/0250648 | A1 * | 10/2007 | Picard | G06F 13/4291 710/9 |
| 2008/0080492 | A1 * | 4/2008 | Pyeon | G06F 1/04 370/389 |
| 2011/0032932 | A2 * | 2/2011 | Pyeon | G06F 13/4243 370/389 |
| 2013/0089157 | A1 * | 4/2013 | Chu | H04L 61/2038 375/259 |
| 2014/0173081 | A1 * | 6/2014 | Knapp | H04L 61/2038 709/223 |

OTHER PUBLICATIONS

Gyu Myoung Lee et al., "A survey of multipath routing for trafffic engineering," Information and Communications University (ICU), pp. 1-27.
International Search Report PCT/ISA/210 for International Application No. PCT/EP2013/059777 Dated Oct. 2, 2013.
Written Opinion of the International Searching Authority PCT/ISA/237 for International Application No. PCT/EP2013/059777 dated Oct. 2, 2013.

* cited by examiner

METHOD AND COMPUTER PROGRAM PRODUCTS FOR ROUTING A DATA UNIT

FIELD OF THE INVENTION

The present invention generally relates to routing of data frames, data cells, data packets, . . . generally called data units through a network of nodes. The invention more particularly concerns an efficient routing mechanism that can be applied in a network with one-dimensional topology, such as for instance a multi-hop backplane.

BACKGROUND OF THE INVENTION

In a network with one-dimensional topology, the nodes are connected to form a chain. Typically, each node shall be connected to its direct two neighbours in the chain through so called first hop connections. In addition, each node may be connected to its direct neighbour's neighbours through so called second hop connections. Each node shall have a unique address or identity. Given a certain source address and destination address for a data unit, there exist multiple paths over which the data unit can be routed from source to destination. The number of possible routes from source to destination scales exponentially with the number of nodes in the network. Therefore, establishing an optimal path between source and destination poses a technical challenge.

Existing mechanism to route a data unit from a source node with source address to a destination node with destination address encompass the distance-vector routing protocol and the link-state routing protocol.

According to the distance-vector routing protocol, each node maintains a vector table of minimum distance to every other node. The distance in this context must be interpreted broadly and generally represents a cost for reaching the destination node, e.g. an amount of hops, delay, available bandwidth, etc. Periodically, each node distributes all or part of its routing table to its neighbours. Upon receipt of a data unit, the receiving node determines the route with minimum distance to the destination and as a result thereof the direction (or exit interface) that will be used for forwarding the data unit to the next node. More details on the distance-vector routing protocol are retrievable from Wikipedia via the URL:

http://en.wikipedia.org/wiki/Distance-vector_routing-_protocol

According to the link-state routing protocol, each node maintains a connectivity map to the rest of the network in the form of a graph. The only information shared between nodes is connectivity related, i.e. each node informs the network about its neighbours, enabling each node to independently determine which nodes are connected to which other nodes. Upon receipt of a data unit, the receiving node can determine the best logical path toward the destination of the data unit, and derive therefrom the exit interface for forwarding the data unit. More details on the link-state routing protocol are retrievable from Wikipedia via the URL:

http://en.wikipedia.org/wiki/Link-state_routing_protocol

Both the distance-vector routing protocol and the link-state routing protocol require extensive exchange of information for the construction and maintenance of routing tables. The memory requirements for storing these routing tables, the overhead as a result of maintenance of these routing tables, and the time needed to search these routing tables when determining the next hop increase proportionally with the network size. In particular when the network topology imposes restrictions, like for instance with one-dimensional network topologies, the complexity of the existing routing mechanisms is too high.

It is an objective of the present invention to disclose a method and computer program products for routing data units that overcomes the above defined drawbacks of the existing routing protocols. More particularly, it is an objective of the present invention to teach a method and computer program products for routing in one-dimensional networks that avoids construction and maintenance of routing tables in the different nodes, and significantly reduces the time needed to route data units. It is a further objective to reduce the memory requirements on nodes in networks with a one-dimensional topology, and to make these memory requirements independent of the network size. It is a further objective to reduce the overall complexity for routing data units from source to destination in networks with a one-dimensional topology.

SUMMARY OF THE INVENTION

According to the present invention, the above-defined objectives are realized by the method of claim 1 for operating in a node a data processing system for routing a data unit through a chain of nodes wherein each node is connected to its first hop neighbours through first hop links and each node is connected to its second hop neighbours through second hop links, and wherein nodes are assigned unique addresses that are increasing in one direction of appearance of the nodes in the chain, the method comprising:

A. verifying at the node if a destination address of the data unit corresponds with an address of a first hop neighbour or an address of a second hop neighbour of the node; and
either:

B. routing by the node the data unit directly to the first hop neighbour or the second hop neighbour if the destination address respectively corresponds with an address of the first hop neighbour or the second hop neighbour;
or:

C1. determining at the node a difference between the destination address and an address of the node, or between said destination address and an origin address of said data unit;

C2. selecting by the node a routing direction depending on the sign of the difference;

C3. selecting by the node a first hop link when the magnitude of the difference is below a threshold value or selecting a second hop link when the magnitude of the difference is above the threshold value; and C4. routing the data unit in the routing direction through a first hop link or a second hop link as selected.

Thus, the method according to the invention solves the routing complexity by imposing the topological information of the one-dimensional network on the addressing scheme of the nodes. Indeed, in such one-dimensional network, the nodes form a chain, and the nodes can be addressed from left to right (or from right to left) in ascending order. As a result of such addressing scheme, the routing decision for a data unit received by a node can be made individually by that node based on the source and destination address of the data unit or based on the destination address of the data unit and the address of the node receiving the data unit. Constructing and maintaining a routing table is no longer necessary, and the nodes do not have to share connectivity or distance information as is required in the existing routing protocols. This significantly reduces the overhead. The routing decision according to the invention can be made fast by calculating the difference between the destination and source addresses of the data unit or by calculating the difference between the destination address and the address of the node making the routing decision. The sign of this difference shall determine the direction for forwarding the data unit in the chain, whereas the magnitude shall determine if a first hop or second hop connection will be used for forwarding the data packet. No table lookups are needed to make the routing decision, hence reducing complexity, memory and processing requirements.

As defined by claim 2, the method according to the invention further comprises the steps of:
  verifying if the destination address corresponds with an address of the node; and
  withdrawing the data unit from the chain for processing by the node when the destination address corresponds with the address of the node.

Thus, in case the current node receiving the data unit is the destination node, the node will extract the data unit from the network for processing.

According to an optional aspect of the method according to the present invention, defined by claim 3, the threshold value is determined in function of length of the chain or system requirements.

Indeed, the threshold value that is used in the criterion to decide if a first hop connection or second hop connection will be used, preferably depends on the size of the network, and can also be determined based on system requirements, e.g. minimum latency, maximum throughput. The threshold value can be imposed on each node in the network at system start-up or after a topology update, e.g. after insertion or removal of node. The threshold can be changed dynamically, e.g. based on changing traffic flows.

Further optionally, as defined by claim 4, the chain of nodes may form part of a backplane system.

Indeed, in certain applications like high-speed backplane systems, complex routing protocols with high memory and overhead requirements and time-consuming, processing intensive routing algorithms, are not acceptable. In such applications, routing with minimal complexity, taking benefit of the topology of the network according to the present invention, is advantageous.

In an embodiment of the invention wherein the difference is calculated between the destination address and the origin address of the data unit, as defined by claim 5, the method may further comprise:
  adding a first bit to the data unit, the first bit being indicative for a routing direction selected; and
  adding a second bit to the data unit, the second bit being indicative for selection of the first hop link or the second hop link.

Indeed, if the criteria for routing is based on the difference between the destination and source addresses of the data unit, the routing decision can be made once at the source node and be communicated to the other nodes via two bits added to the data unit, e.g. to its header. One bit represents the direction selection whereas the second bit represents the long/short path selection. The source node checks the sign and magnitude of the difference, makes the decision and adds or changes the corresponding two bits in the header. As such, the intermediate nodes only need to check the corresponding bits in the header to decide where to forward the data unit, which can further simplify the routing procedure.

In addition to a computer-implemented method as defined by claim 1, the present invention relates to a corresponding data processing system comprising means for carrying out such a method. Such data processing system is defined by claim 6.

Further, as is indicated by claims 7 and 8, the present invention also relates to a corresponding computer program comprising software code adapted to perform the method, and a computer readable storage medium comprising such computer program.

DETAILED DESCRIPTION OF EMBODIMENT(S)

Figure 1:
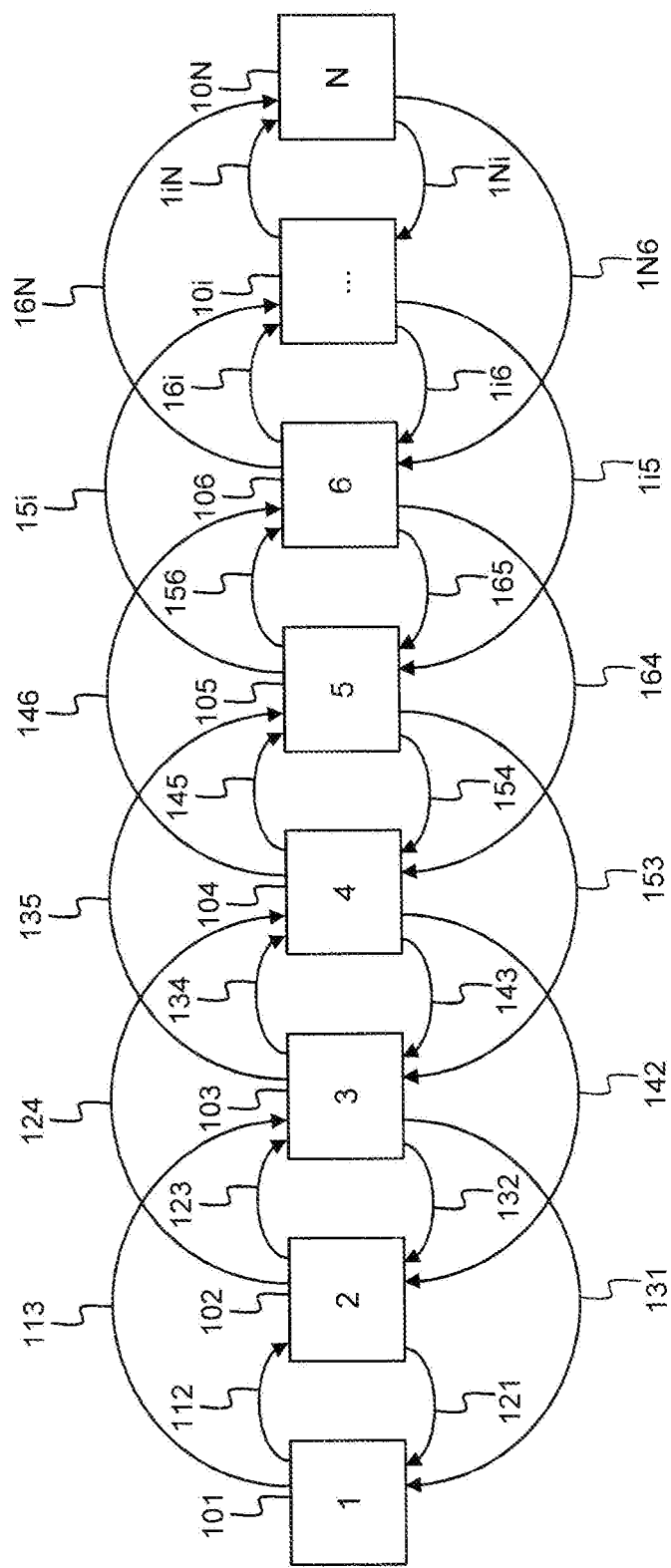
FIG. 1 illustrates a network with one-dimensional topology wherein the nodes implement an embodiment of the routing method according to the present invention.

FIG. 1 shows a network arranged in chain topology. Each node, i.e. 101, 102, 103, 104, 105, 106, . . . 10*i*, . . . 10N, is connected to its direct neighbors and to its neighbors' neighbor. Each node is assigned a unique address. In the particular embodiment of FIG. 1, the address assignment is from left to right in ascending order: node 101 is assigned address 1, node 102 is assigned address 2, node 103 is assigned address 3, node 104 is assigned address 4, node 105 is assigned address 5, node 106 is assigned address 6, . . . node 10*i* is assigned address i, . . . node 10N is assigned address N. As such, topology information is imposed on the node addresses. For example, the node with address 6 is located to the right of the node with address 1. In addition, the addressing scheme provides information about how far source and destination nodes are from each other. By subtracting destination and source addresses, information indicative for the distance between source and destination is obtained. Each node is connected to its direct neighbor in upward and downward direction of the addressing scheme. Thereto, first hop connections are foreseen. In FIG. 1, these first hop links are denoted 112, 123, 134, 145, 156, 16*i*, . . . 1*i*N in upward direction and 121, 132, 143, 154, 165, . . . 1*i*6, . . . 1Ni in downward direction. Each node is also connected via a second hop link to its neighbors' neighbors. In FIG. 1, these second hop links are denoted 113, 124, 135, 146, . . . 15*i*, . . . 16N in upward direction and 131, 142, 153, 164, . . . 1*i*5, . . . 1N6 in downward direction of the addressing scheme.

Figure 2:
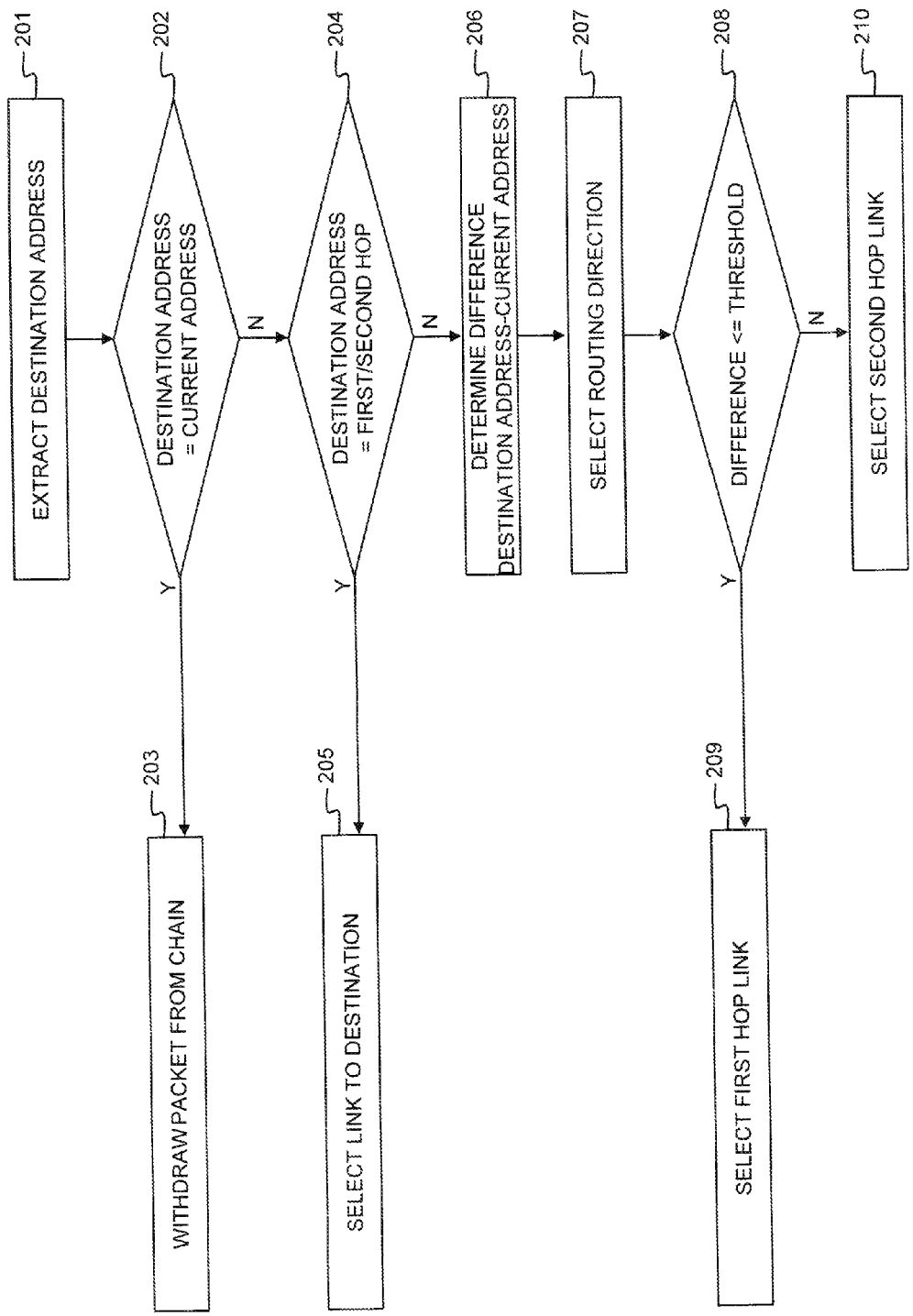
FIG. 2 is a flow chart illustrating an embodiment of the routing method according to the present invention, as applied by the nodes in FIG. 1.

When a data packet arrives at a node on its way from source to destination, the receiving node shall apply the method illustrated by the flow chart in FIG. 2 for making a routing decision. First, the destination address is extracted from the data packet in step 201. In step 202, the packet's destination address is compared with the current node's address. If the addresses are the same, the data packet is withdrawn from the chain in step 203 and sent to a local card for processing. Otherwise, the packet's destination address is compared with the addresses of the current node's first hop and second hop neighbors in step 204. If the packet's destination node is directly connected to the current node, the data packet will be sent to its destination in step 205, using the direct link thereto. If not, the current node subtracts its address from the destination address in step 206. The sign of this difference enables the current node to determine the routing direction in step 207. If the difference calculated in step 206 is negative, the packet is queued for transmission to the left side, otherwise to the right side in the chain of FIG. 1. After that, based on the difference between current and destination addresses, either a second hop link to the neighbor's neighbor or a first hop link to the direct neighbor will be chosen. This is realized by comparing the difference between current and destination address with a threshold value in step 208. The second hop link is chosen if current node and destination are far from each other (difference>threshold in step 210) in order to reduce the overall hop count. The first hop link is preferred if the current and destination are closer (difference<=threshold in step 209).

It is noticed that the threshold value used in step 208 preferably depends on the size of the network. This threshold value can be imposed onto each node at system start-up and/or can be communicated to each node after each topology update, e.g. as a result of insertion or removal of a node in the chain. The threshold can also be set dynamically, e.g. based on changing traffic flows as to optimize the traffic on the links, etc.

It is further noticed that step 206 may use the difference between source node address and destination node address as an alternative to the difference between the current node's address and destination address. The source node address typically can be extracted from the data packet and therefore is available at each intermediate node receiving the data packet.

The method according to the present invention solves the routing complexity by imposing topological information to the address of each node. As a result, a distributed routing decision can be made at each individual node based on the current node's address, the packet/frame source address and the packet/frame destination addresses. As such, maintaining a big routing table and dissemination of up-to-date link state information at each node is eliminated.

In some applications like e.g. high-speed backplane systems, complicated routing in terms of memory requirements for the routing tables, required time to search these routing tables, and required overhead for maintaining/updating these routing tables present a high cost in terms of hardware complexity, power consumption, and throughput overhead. Therefore, routing with minimum complexity as enabled by the present invention will be needed.

The method according to the invention shall typically be computer-implemented through software running on a data processor in a node, e.g. a router or switch. Generally, a data processing system or computing device that is operated according to the present invention can include a microprocessor, a processor, a workstation, a server, a laptop, a desktop or other computing devices, as would be understood by those of skill in the art.

The data processing system or computing device can include a bus or network for connectivity between several components, directly or indirectly: one or more memory devices, one or more processors, input/output ports, a power supply, etc. One of skill in the art will appreciate that the bus or network can include one or more busses, such as an address bus, a data bus, or any combination thereof, or can include one or more network links. One of skill in the art additionally will appreciate that, depending on the intended applications and uses of a particular embodiment, multiple of these components can be implemented by a single device. Similarly, in some instances, a single component can be implemented by multiple devices.

The data processing system or computing device can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CDROM, digital versatile disks (DVD) or other optical or holographic media, magnetic cassettes, magnetic tape, magnetic disk storage or other magnetic storage devices that can be used to encode information and can be accessed by the data processing system or computing device.

The memory can include computer-storage media in the form of volatile and/or nonvolatile memory. The memory may be removable, non-removable, or any combination thereof. Exemplary hardware devices are devices such as hard drives, solid-state memory, optical-disc drives, or the like. The data processing system or computing device can include one or more processors that read data from components such as the memory, the various I/O components, etc.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order, unless explicitly stated. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method of operating in a node a data processing system for routing a data unit through a chain of nodes wherein each node is connected to its first hop neighbours through first hop links and each node is connected to its second hop neighbours through second hop links, and wherein nodes are assigned unique addresses that are increasing in one direction of appearance of said nodes in said chain, said method comprising:
   A. verifying at said node if a destination address of said data unit corresponds with an address of a first hop neighbour or an address of a second hop neighbour of said node; and either:
   B. routing by said node (103) said data unit directly to said first hop neighbour or said second hop neighbour if said destination address respectively corresponds with an address of said first hop neighbour or said second hop neighbour; or:

C1. determining at said node a difference between said destination address and an address of said node, or between said destination address and an origin address of said data unit;

C2. selecting by said node a routing direction depending on the sign of said difference;

C3. selecting by said node a first hop link when the magnitude of said difference is below a threshold value or selecting a second hop link when the magnitude of said difference is above said threshold value; and C4. routing said data unit in said routing direction through a first hop link or a second hop link as selected.

2. A method according to claim 1, further comprising the steps of:

verifying if said destination address corresponds with an address of said node; and withdrawing said data unit from said chain for processing by said node when said destination address corresponds with said address of said node.

3. A method according to claim 1, wherein said threshold value is determined in function of length of said chain or system requirements.

4. A method according to claim 1, wherein said chain of nodes forms part of a backplane system.

5. A method according to claim 1, wherein said difference is determined between said destination address and said origin address of said data unit, said method further comprising adding a first bit to said data unit, said first bit being indicative for a routing direction selected; and adding a second bit to said data unit, said second bit being indicative for selection of said first hop link or said second hop link.

6. A data processing system comprising means for carrying out the method of claim 1.

7. A computer program comprising software code adapted to perform the method of claim 1.

8. A computer readable storage medium comprising the computer program of claim 7.

\* \* \* \* \*